United States Patent Office 3,585,236
Patented June 15, 1971

3,585,236
N-(α-HYDROXY-β,β,β-TRICHLOROETHYL)-2,6-
DICHLOROTHIOBENZAMIDE
Albrecht Zschocke, Bad Durkheim, and Adolf Fischer, Mutterstadt, Germany, assignors to Badische Anilin- & Soda-Fabrik Aktiengesellschaft, Ludwigshafen (Rhine), Germany
No Drawing. Filed Jan. 8, 1969, Ser. No. 789,956
Claims priority, application Germany, Jan. 17, 1968,
P 16 68 865.6
Int. Cl. C07c 153/05
U.S. Cl. 260—551                           1 Claim

ABSTRACT OF THE DISCLOSURE

A new and valuable thiobenzamide derivative having the formula:

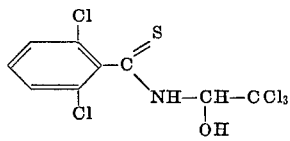

and a method of controlling unwanted plants therewith. The compound has a strong herbicidal effect and does not damage crop plants when used for controlling unwanted plants growing between the same.

---

The present invention relates to a new thiobenzamide derivative, more particularly a new thiobenzamide-chloral derivative, and to a process for controlling undesired plants with this substance.

It is known that 2,6-dichlorobenzamide can be used for controlling weeds. The compatibility of this compound with crop plants such as wheat (*Triticum sativum*), rice (*Oryza sativa*) and Indian corn (*Zea mays*) is however not satisfactory.

It is an object of this invention to provide a new and valuable thiobenzamide derivative. Another object of the invention is to provide a new valuable thiobenzamide-chloral derivative which has good herbicidal activity. A further object of the invention is to provide a process for controlling unwanted plant growth with a new and valuable thiobenzamide-chloral derivative.

These and other objects of the invention are achieved by a thiobenzamide having the formula:

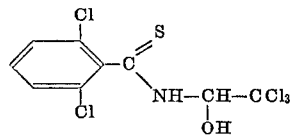

which has good herbicidal activity and good compatibility with crop plants. The following experimental data illustrate the production of the compound according to the invention.

10 parts by weight of 2,6-dichlorothiobenzamide is partly dissolved in 30 parts by weight of benzene and 7.35 parts by weight of chloral is added at a temperature of 5° to 15° C. while cooling. Then the mixture is heated at 50° C. for two hours after which the solvent is removed in vacuo.

The solid residue is taken up in ligroin and suction filtered. 13.5 parts by weight of N-(α-hydroxy-β,β,β-trichloroethyl)-2,6-dichlorothiobenzamide is obtained; melting point from 97° to 99° C.

The compound according to the invention can be converted into a herbicide in the conventional ways by mixing it with solid or liquid carrier materials, for example water, hydrocarbons, clay, fertilizers, borax or diatomaceous earth. It is possible to add wetting agents, dispersing agents, adhesives or other biologically active ingredients such as fungicides, insecticides or other compounds having herbicidal activity. The new herbicide may also be applied as granules.

The following examples illustrate the use of the compound according to this invention.

EXAMPLE 1

The plants: wheat (*Triticum sativum*), rice (*Oryza sativa*), Indian corn (*Zea mays*), annual rye grass (*Poa annua*), orchard grass (*Dactylis glomerata*), slender foxtail (*Alopecurus myosuroides*), wild oats (*Avena fatua*), barnyard grass (*Panicum crusgalli*), mustard (*Sinapis alba*) and chickweed (*Stellaria media*) are treated at a growth height of 4 to 12 cm. with N-(α-hydroxy-β,β,β-trichloroethyl)-2,6-dichlorothiobenzamide (I) and, for comparison, with 2,6-dichlorothiobenzamide (II), in each case at the rate of 1 kg. active dispersed in 500 liters of water per hectare. Three to four weeks later it is established that (I) has a herbicidal effect which is just as good as that of (II), but better compatibility with wheat (*Triticum sativum*), rice (*Oryza sativa*) and Indian corn (*Zea mays*).

The experimental results may be seen from the following Table in which 0=no effect and 100=total destruction.

TABLE

|  | Active ingredient | |
|---|---|---|
|  | (I) | (II) |
| Crop plants: |  |  |
| Wheat | 10-20 | 50-60 |
| Rice | 10 | 30-40 |
| Indian corn | 10-20 | 50-60 |
| Unwanted plants: |  |  |
| Annual rye grass | 90-100 | 90-100 |
| Orchard grass | 90 | 90 |
| Slender foxtail | 80-90 | 80-90 |
| Wild oats | 80 | 80 |
| Barnyard grass | 80-90 | 80 |
| Mustard | 90 | 90 |
| Chickweed | 80-90 | 80-90 |

EXAMPLE 2

Pots are filled with loamy sandy soil which is sown with seeds of annual rye grass (*Poa annua*), orchard grass (*Dactylis glomerata*), slender foxtail (*Alopecurus myosuroides*), wild oats (*Avena fatua*), mustard (*Sinapis alba*) and chickweed (*Stellaria media*). Then the soil is treated with N-(α-hydroxy-β,β,β-trichloroethyl)-2,6-dichlorothiobenzamide at the rate of 1 kg. of active ingredient dispersed in 500 liters of water per hectare. Ten days later it is evident that neither the broadleaved nor the grassy weeds have germinated. Even after five to six weeks no growth of weeds can be observed.

We claim:
1. The thiobenzamide derivative having the formula:

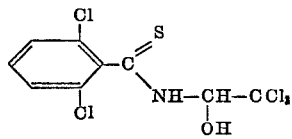

References Cited

UNITED STATES PATENTS 3,419,567   7/1968   Wijma _____ 260—551

HENRY R. JILES, Primary Examiner

H. I. MOATZ, Assistant Examiner

U.S. Cl. X.R.

71—100